United States Patent [19]
Collins, Jr. et al.

[11] 3,911,948
[45] Oct. 14, 1975

[54] PRESSURE REGULATOR

[75] Inventors: Watson R. Collins, Jr., Fort Washington; James J. Kokinda, Allentown, both of Pa.

[73] Assignee: Air Products and Chemicals, Inc., Allentown, Pa.

[22] Filed: Jan. 30, 1974

[21] Appl. No.: 437,896

[52] U.S. Cl. .......... 137/505.42; 251/363; 251/368; 137/73; 137/505.11
[51] Int. Cl.² ........................................ F16K 31/12
[58] Field of Search ....... 137/505.42; 251/332, 363, 251/368

[56] References Cited
UNITED STATES PATENTS

| | | | |
|---|---|---|---|
| 2,768,643 | 10/1956 | Acomb .......................... | 137/505.42 |
| 2,918,081 | 12/1959 | Laver ............................ | 137/505.11 |
| 2,971,537 | 2/1961 | Kowalski .................. | 137/505.11 X |
| 3,022,978 | 2/1962 | Kowalski ...................... | 251/363 X |
| 3,044,743 | 7/1962 | Siegel ............................ | 251/363 X |
| 3,536,092 | 10/1970 | Klasson ..................... | 137/505.42 X |
| 3,727,880 | 4/1973 | Stock ............................ | 251/333 X |

Primary Examiner—Harold W. Weakley
Attorney, Agent, or Firm—James C. Simmons; Barry Moyerman

[57] ABSTRACT

A fluid pressure regulator for delivering a gas, e.g. oxygen, from a high-pressure source, e.g. storage cylinder, to an apparatus, e.g. welding torch, at a lower adjustably controllable pressure. The regulator is characterized in that sources of combustible materials normally used for valve seating are minimized and destruction of the seat does not open the regulator to full source pressure. An improved pressure relief valve vents the regulator to ambient atmosphere in the event of either large pressure surges or elevated temperatures inside of the regulator, regardless of pressure.

3 Claims, 7 Drawing Figures

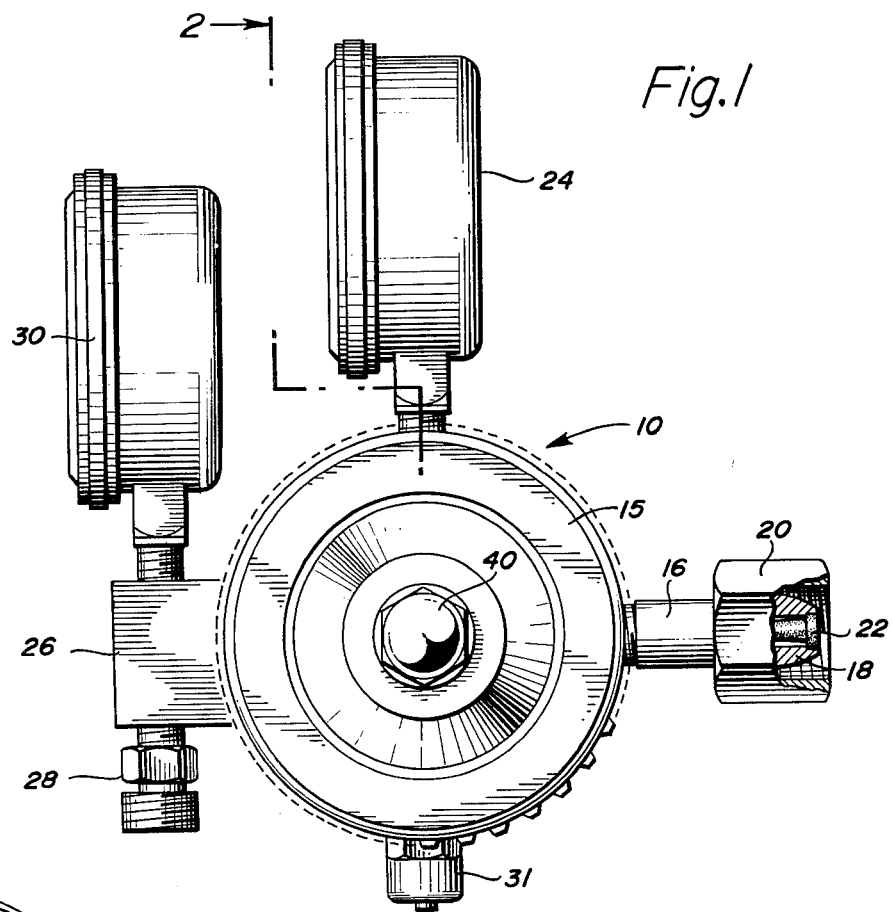
Fig.1
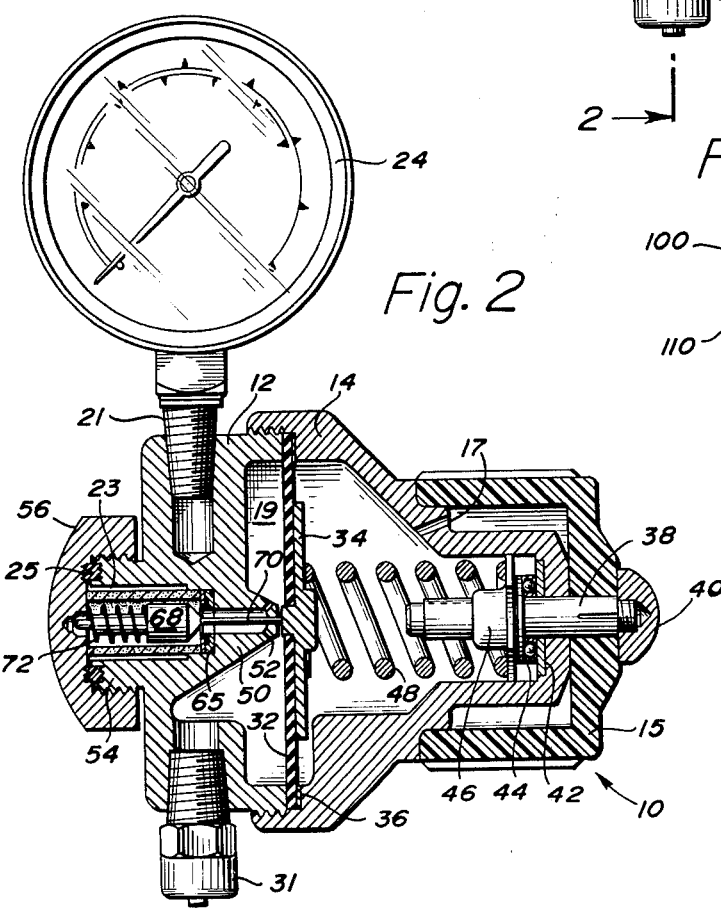
Fig.2
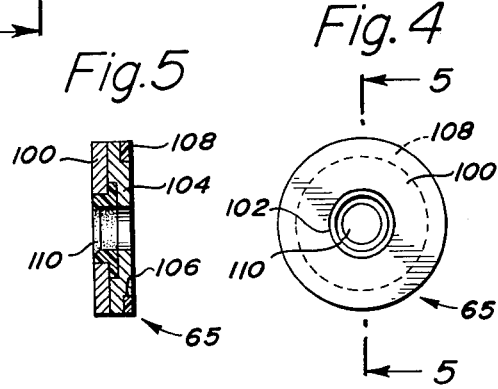
Fig.5
Fig.4

PRESSURE REGULATOR

BACKGROUND OF THE INVENTION

This invention pertains to pressure regulators of the type used to control the pressure of a fluid usually in gaseous form as it is withdrawn from a receptacle where it is normally stored at high pressures, e.g. in excess of 500 psi. Such regulators are commonly employed to deliver the fluid to a point of use such as an oxygen mask or a welding torch from a cylinder of oxygen at delivery pressures of less than 150 psi. The fluid pressure regulator devices include a manually operable control knob for adjusting the desired delivery pressure regardless of the source pressure involved.

Pressure regulators of the type disclosed in this application are illustrated by U.S. Pat. Nos. 2,115,512, 2,156,823, 2,487,650, 2,614,573, 2,747,607, 2,908,158, 2,918,081, and 3,547,143. In particular, the regulator of this invention is an improvement over the fluid pressure regulators disclosed in U.S. Pat. Nos. 2,918,081 and 3,536,092, which patents are owned by the Assignee of the present invention.

With the prior art regulators such as shown in U.S. Pat. No. 2,918,081, when the regulator is used to control the delivery of oxygen from a high-pressure source, which source is usually in excess of 500 psi, if there are contaminants inside the regulator such as grease, rust, or hydrocarbons in the presence of pure oxygen, these contaminants will act as fuel. The regulator materials such as elastomeric materials used to provide the valve seat will under certain conditions ignite to act as fuel. For example, ignition energy can be supplied by heat of recompression which is heat generated by the expansion and sudden compression of oxygen or by particles of contamination impinging on the internal surfaces of the regulator. This condition can exist when a regulator valve is opened rather quickly. If this condition does exist and ignition takes place, the seat is consumed with the resultant explosion of the regulator. While such explosions are rare, they nonetheless do happen.

SUMMARY OF THE INVENTION

In order to provide an improved regulator, it has been discovered that sources of fuel inside the regulator can be minimized by selecting the proper materials of construction and particularly by providing a multi-piece valve seat wherein combustible materials necessary for sealing the valve are held to an absolute minimum. Furthermore, a safety relief valve that is responsive to pressure surges and to elevated temperature independent of pressure inside the regulator aids in preventing combustion contained inside the regulator. The improved relief valve is achieved by having a readily fusible element to open the relief valve at a preset temperature independent of the pressure inside the regulator.

Therefore, it is the primary object of the present invention to provide an improved pressure regulator.

It is another object of the present invention to provide a regulator having minimal fuel sources contained within the regulator.

It is still another object of the present invention to provide a pressure regulator with a dual-acting safety relief valve.

It is yet another object of the present invention to provide a pressure regulator that will vent internal combustion in a safe manner.

BRIEF DESCRIPTION OF THE DRAWING

FIG. 1 is a front elevational view of a pressure regulator according to the present invention.

FIG. 2 is a section taken along the line 2—2 of FIG. 1.

FIG. 4 is an end view of the valve seat of the present invention.

FIG. 5 is the section taken along the line 5—5 of FIG. 4.

DETAILED DESCRIPTION OF THE PREFERRED EMBODIMENT

Figure 3:
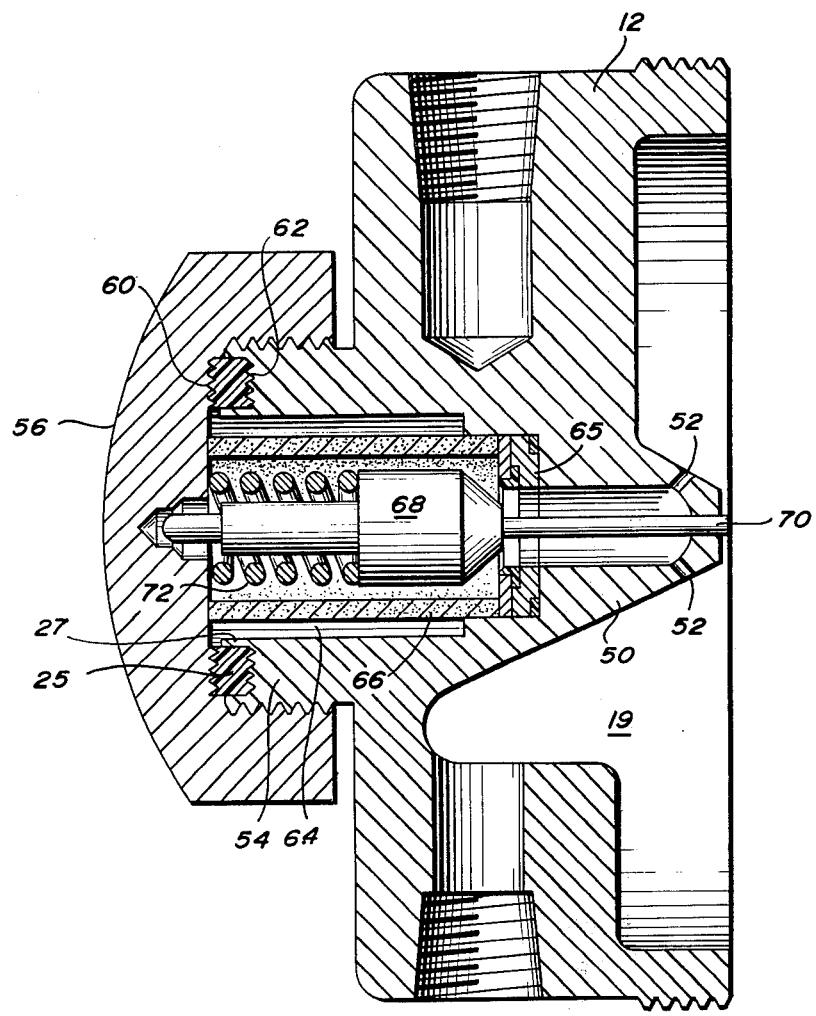
FIG. 3 is an enlarged sectional view of the body of the regulator with pressure gauge and relief valve removed.

Gas pressure regulators such as shown in the drawing and, in particular, FIGS. 1 and 2 are used for delivering a gas (oxygen) to a point of use at a pressure of usually less than 150 psi. In the medical field, oxygen is delivered to a mask or other breathing device for use with a patient. In welding applications, the oxygen is usually delivered via a hose to a welding torch. The oxygen is normally stored at pressures in excess of 500 psi in a receptacle such as individual cylinders or large storage tanks. The regulator functions to safely reduce the high container pressure of the gas and deliver it to the lower pressure for usage.

If an oxygen regulator is not properly maintained or operated with care, a combination of conditions can exist which under certain operating conditions can cause the regulator to either burn out or explode. Such occasions are rare, but they do happen. Contaminants within the oxygen regulator such as grease, rust, or hydrocarbons will act as a fuel in the presence of pure oxygen. Sometimes a regulator material, e.g. stainless steel, will act as fuel and support combustion. This is true because all materials in the presence of high-pressure oxygen (above 500 psi) will burn vigorously.

The ignition of the combustible materials can be supplied by the heat of recompression. This condition happens or can happen when a regulator valve is suddenly opened to expose the internal portions to the high-pressure oxygen.

In order to minimize the sources of possible combustion, it has been discovered that certain materials, usually plastic or elastomeric in nature, conventionally used to provide sealing of the pressure control valve should be used in minimum quantities to minimize the energy release if combustion is started. Furthermore, the combustion of such materials should not render the valve inoperative thereby producing large quantities of combustion supporting gas, e.g. oxygen. It has been shown that in order to maximize safety and minimize effects of internal combustion, the regulator must have means to rapidly remove excess gas build-up and to minimize exposure of the internal parts of the regulator to elevated temperatures thus preventing propagation of combustion. By combination temperature and pressure sensitive safety valve, these ends can be achieved.

There is shown in FIG. 1 a pressure regulator 10 that is ideally suited for controlling withdrawal of oxygen from a source of high pressure. Although regulator 10 is ideally suited for oxygen, it can be used for any of the gases normally dispensed from cylinders and the like.

The regulator 10 includes a body 12 (FIG. 2) and a bonnet 14 (FIG. 2) threadably connected to define a chamber. Regulator 10 includes an inlet conduit 16 with a suitable nut or fastener 20 for connecting the inlet conduit 16 to a source of high-pressure gas, e.g. a cylinder. Inlet conduit 16 has a rounded nose 18 to mate with the corresponding fitting on the source of gas and further includes a porous filter element 22, to filter contaminant particles from the gas. Regulator 10 has an outlet 26 containing a fitting 28 for receiving a hose or other delivery device. The regulator includes a safety relief valve 31, a control knob 15, highpressure gauge 24, and low-pressure gauge 30.

Referring to FIG. 2, the valve body 12 and bonnet 14 are separated by a resilient diaphragm 32, which diaphragm is usually constructed from neoprene rubber. One face of the diaphragm 32 has an annular ring 36 of a metal such as brass to provide strength at the peripheral sealing edge and a backing plate 34 to provide a bearing surface for spring 48. Projecting through the end of bonnet 14 and rotatably mounted therein is a spindle 38. In communication with spindle 38 is bearing 44, bearing plate 42 and follower nut 46 to control compression and relaxation of spring 48. The projecting end of spindle 38 has knob 15 affixed thereto by means of end nut 40. As the knob 15 is rotated, the spring can be compressed to urge the diaphragm to the left as shown in FIG. 2. As the cap is rotated in the opposite direction, compression on the spring is decreased and the diaphragm 32 returns to its normal position such as shown in FIG. 2. The bonnet 14 contains suitable vent holes 17 so that the chamber defined by the bonnet 14 and diaphragm 42 is maintained at ambient pressure.

The body 12 of regulator 10 and the diaphragm 32 define a low-pressure chamber 19. As shown in FIG. 2, communicating with the low-pressure chamber 19 is a pressure relief valve 31, the function of which will be explained in greater detail hereinafter.

The body 12 has a suitable fitting 21 for receiving low-pressure gauge 24 as shown and on the opposite end from the diaphragm 32 a projection 54 for receiving end cap 56.

As shown in FIG. 2, the low-pressure gas enters the chamber 19 defined by body 12 and diaphragm 32 through ports 52 in projection 50 which defines the forward end of and encloses the high-pressure chamber 64 of the regulator. The high-pressure gas is introduced into the high-pressure chamber 64, which is defined by body 12, projection 50, projection 54, and the cap 56, through a conduit (not shown) as is well known in the art. The entering gas passes through a porous filter 66 into the area surrounding the valve stem 68, past the valve stem 68 through valve seat 65, past valve pin 70, out ports 52 into the low-pressure chamber 19. The opening between valve stem 68 and valve seat 65 controls the delivery pressure of the gas. As shown in FIG. 3, the valve pin 70 is normally urged toward the valve seat 65 by a spring 72. The valve stem is opened by pushing the valve stem 68 toward the left (end cap 56) by means of activating pin 70, which projects through the body 12 and bears on the diaphragm 32 backing plate 34. Thus, as the diaphragm 32 moves to the left, the valve stem 68 is pushed to the left and the high-pressure fluid passes into the low-pressure chamber 19.

As shown in FIG. 3, the cap 56 is sealed to the body 12 by means of complimentary grooves or ridges 60, 62 between which is placed a sealing member 25. The projection 54 of body 12 has suitable threaded connections for facilitating removal of the cap to service the regulator. It should be noted that the element 25 is preferably of a fluorocarbon plastic material sold under the tradename KEL-F and has, because of annular lip 27 on projection 54, minimum surface exposed to the high-pressure gas while forming an effective seal. In prior art regulators, the cap is usually provided with a fluidtight seal by an O-ring disposed between the cap 56 and a flat surface on the end of projection 54.

The cap 56 forces the porous filter 66 against the valve seat 65, thus providing a seal between the filter and the vaive seat so that all entering gas comes through the filter.

Also, filter 66 presses seat assembly 65 into the bottom of the counterbore (chamber 64) in body 12 sealing against body 12 by seal 108 (FIG. 5) thus preventing gas from leaking around seat 65 into low-pressure chamber 19.

There is shown in FIGS. 4 and 5 an improved valve seat 65 consisting of a first flat washer 100, a second having a central aperture 102. Mating with the first washer 100 is a second washer 104 containing on its outer surface an annular recess or groove 106. The washer 104 has an internal diameter defining the maximum regulator valve opening which is smaller than the internal diameter of washer 100. It also contains an enlarged portion of the inside diameter so that in cross-section, the ring 104 has a Z-shaped appearance. Groove 106 is made to receive a sealing member such as a KEL-F washer. A KEL-F member 110 in the shape of a stepped flange is inserted between washers 100 and 104 and provides the valve seating member. The flange 110 has an inside diameter equal to the inside diameter of washer 104 and can contain a chamfered end 111 as shown to mate with the tapered end of valve stem 68. The seat 65 is assembled into the regulator as shown in FIG. 3 so that the plate 104 is held by the counterbore in section 50 of the body 12 with a fluid seal being provided by the washer 106. Valve seat member 110 faces the valve stem 68 and provides the sealing means when valve stem 68 is extended against the member 110. The resilient material is needed to account for or to provide a seal if there should be a slight misalignment of the valve stem or wear on the valve stem before the normal maintenance period has expired.

In the preferred construction of the regulator as shown in FIGS. 1 and 2, the body 12 and bonnet 14 of the regulator are made of brass. Tests have shown that stainless steel is more easily ignited in the presence of high-pressure oxygen than other materials. Therefore, the activating pin 70 is fabricated from an iron-chromium-nickel alloy sold under the tradename of INCONEL, the valve stem 68 and porous filter 66 are fabricated from a nickel-copper alloy sold under the tradename of MONEL and the spring 72 is preferably fabricated from INCONEL. The valve seat 65 is fabricated from brass (members 100 and 104) and a synthetic material KEL-F (Members 106 and 110). The KEL-F material has been found to be more fire resistant than prior materials such as neoprene rubber, and the like.

With this combination of materials, the following benefits are achieved. The four-part seat exposes only the smallest amount of elastomeric material (KEL-F)

to the oxygen since there is just enough exposed elastomeric material to seat the valve stem 68. The two brass pieces 100 and 104 act as a large heat sink. If the small amount of KEL-F contained in member 110 is ignited and consumed, the valve stem 68 can still close against the surrounding brass or metal in members 100 and 104. Furthermore, because the soft seating material 110 is supported by the brass, less deformation and longer seat life can be expected. The KEL-F washer 106 is completely surrounded by brass and, therefore, would not be exposed to elevated temperatures since the brass pieces 100 and 104 act as a heat sink. The minimization of the presence of consumable fuel (KEL-F, nylon or the like) such as shown in the valve seat in connection with the regulator of U.S. Pat. No. 2,918,081 prevents large flows of high-pressure oxygen from continuing through the regulator thereby providing secondary reactions. In the regulator shown in FIGS. 1, 2, and 3, the greatest surface areas facing the reaction are of metal, such as brass, having a low auto ignition point which resists combustion. Furthermore, the brass members of the valve seat conduct heat away from the KEL-F or other elastomeric materials. As stated above, even if the KEL-F material is deformed or consumed, the valve stem 68 can seat against the metal thereby retarding the flow of oxygen.

Figure 7:
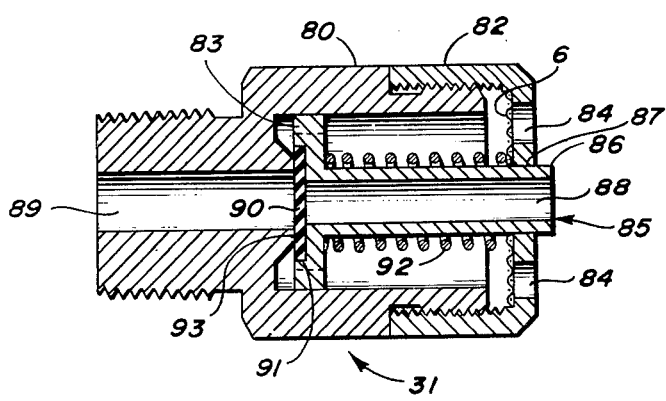
FIG. 7 is a section taken along the line 7—7 of FIG. 6.
Figure 6:
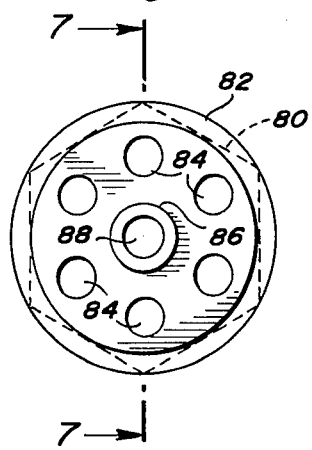
FIG. 6 is an end view of the safety relief valve according to the present invention.

There is shown in FIGS. 6 and 7 an improved safety relief valve shown as 31 in FIGS. 1-3. The safety relief valve 31 includes a body 80 with an end 82 affixed thereto as by threads as shown in the drawing. The cap 82 contains vent holes 84 for conducting vented pressurized fluid away from the valve 31. Disposed within the valve housing 80 and cap 82 is a valve stem 85 comprising a body 86 and closure member 83 having a central bore 88. The valve stem 85 projects through a suitable aperture 87 in cap 82. The valve stem 85 bears against the raised lip 93 of inlet port 89 and is closed by an elastomeric member 90 disposed within a recess 91 in end closure member 83 of the valve stem 85 as shown. The preferred material for elastomeric member 90 is neoprene rubber.

The closure member 83 of valve stem 85 bearing against the inlet port 89 is a square or hex within a cylinder or has radial grooves or slots to allow passage of the gas from the inlet port 89 to the vent holes 84. The valve stem is urged against the inlet port 89 by means of an element 92 such as a coil spring. Inlet port 89 includes the raised lip portion 93 which concentrates compressive forces on member 90 thus effecting an improved seal. In the event of large pressure surges at the inlet 89, the valve stem 86 moves toward the right compressing spring 92 thus allowing the gas to flow into the relief valve and out of the holes 84. In the event of combustion inside of the regulator at lower pressures than that which would cause the valve to open, the elastomeric member 90 is consumed and the gas and combustion products are conducted away from the regulator through bore 88 in valve stem 85. As shown in FIGS. 1 and 2, the safety relief valve 31 is mounted so that any combustion products are directed downwardly away from the valve. In the normal operating position of regulator 10, the safety valve points toward the floor, away from the connection with the source of high-pressure fluid.

The retractable, spring-loaded relief valve 31 without the fusible element 90 would not activate unless a preset pressure level was exceeded. Such preset pressures are usually on the order of 75 to 250 psig for oxygen. If the valve seat is consumed by combustion inside the regulator and the pressure is less than the minimum pressure at which the valve 31 is set to open, the elastomeric member 90 will be consumed and the combustion reaction will be vented to the atmosphere thus minimizing the effects of reaction by containing the reaction first in the regulator and then directing it away from the regulator. In the normal course of events, the reaction would start in the high-pressure chamber and if it moves to the low-pressure chamber, the diaphragm could burn thus causing cataclysmic failure of the regulator. With the interposition of the fusible element 90 in the safety relief valve 31, the valve will open thus removing the combustion from the regulator and protecting the diaphragm.

As is apparent in order to protect the regulator, the gas must be removed quickly from the low-pressure side to prevent burning of the diaphragm by minimizing time and temperature. This is achieved by the neoprene member 90 which burns and conducts products of combustion and gases out of the regulator thus the neoprene member 90 acts as a fuse.

It is apparent that other materials can be substituted for those disclosed herein. However, the minimization of the combustible materials and the use of a fusible element in the safety relief valve act in concert to achieve the overall improved regulator.

Having thus described our invention, what we desire to be secured by Letters Patent of the United States is set forth in the following claims.

We claim:

1. In an apparatus for maintaining constant lower pressure of a gas delivered from a relatively high pressure source, of the type including a casing having an internal flexible diaphragm dividing said casing into two major chambers, one chamber being vented to the atmosphere and containing adjustable resilient means for exerting a predetermined constant pressure against the diaphragm, and the other chamber being a gas chamber divided into two sub-chambers a first inlet sub-chamber for receiving said high pressure gas and a second outlet sub-chamber for accumulating and delivering said gas at a lower pressure to outlet means with valve-controlled means connectable between said first and second sub-chambers to regulate the pressure of said gas in said outlet sub-chamber; a removable valve seat insert ring of an elastomeric material or metal covered elastomeric material whose central opening provides the inlet to the lower pressure gas chamber, a spring-loaded valve assembly co-axial with said insert ring and including a conical valve member movable along the common axis and being constantly urged by its valve spring toward the seating engagement about the inner perimeter of said insert ring opening; and means associated with the forward end of said conical valve member and with the central portion of said diaphragm to effect movement of said valve member in accordance with the movement of said diaphragm resulting from an imbalance between the force exerted upon said diaphragm by said resilient means within the vented chamber and the force exerted oppositely thereon by the gas pressure within said gas chamber, the improvement which comprises:

a composite valve seat insert comprising a pair of flat, cylindrical, metallic washer-like members held in face to face relationship;

the first of said pair of washers having an annular recess in the face that is not in contact with the second of said pair of washers;

the first and second of said washers having means on their respective inside diameters to hold an insert member when said first and second washers are assembled in face to face relationship;

a first resilient member dispersed in the annular recess in said first washer;

a second resilient insert member disposed within and held by the holding means as defined by the assembled first and second washers, said second resilient member is in the shape of a stepped flange with the projecting inside diameter edge chamfered to facilitate more intimate contact with said spring-loaded valve;

said valve seat constructed and disposed within said apparatus so that if said first and second resilient members are consumed by combustion the remaining valve seat members will retain their relationship and provide a metal-to-metal seal between said valve seat assembly, said valve and said gas chamber.

2. A valve seat according to claim 1 wherein the first and second resilient members are Kel-F.

3. A valve seat according to claim 1 wherein the first resilient member is a flat annular washer.

* * * * *